US006453571B1

(12) United States Patent
Crossan, Jr.

(10) Patent No.: US 6,453,571 B1
(45) Date of Patent: Sep. 24, 2002

(54) THERMOCOUPLE TILT SENSING DEVICE

(75) Inventor: Wallace R. Crossan, Jr., Huntingdon Valley, PA (US)

(73) Assignee: The Fredericks Company, Huntingdon Valley, PA (US)

( * ) Notice: Subject to any disclaimer, the term of this patent is extended or adjusted under 35 U.S.C. 154(b) by 25 days.

(21) Appl. No.: 09/672,906

(22) Filed: Sep. 28, 2000

(51) Int. Cl.$^7$ .................................................. G01C 9/00
(52) U.S. Cl. ........................... 33/366.11; 374/6; 33/315
(58) Field of Search ............................ 33/366.11, 315; 374/6

(56) References Cited

U.S. PATENT DOCUMENTS

| | | | |
|---|---|---|---|
| 2,021,573 A | * 11/1935 | Alder | 374/6 |
| 2,440,189 A | 4/1948 | Zworykin | |
| 2,455,394 A | 12/1948 | Webber | |
| 3,084,557 A | 4/1963 | Ahlefeldt | |
| 3,241,374 A | 3/1966 | Menkis | |
| 3,416,373 A | * 12/1968 | Havens | 374/6 |
| 3,664,196 A | 5/1972 | Codina | |
| 5,133,417 A | * 7/1992 | Rider | 374/6 |
| 5,581,034 A | 12/1996 | Dao et al. | |
| 5,630,280 A | 5/1997 | Crossan, Jr. | |
| 5,852,878 A | 12/1998 | Seipp, Jr. et al. | |

OTHER PUBLICATIONS

"Semiconductor Thermoelements and Thermoelectric Cooling", A.F. Ioffe, ©1957 by Infosearch, Ltd., pp. 10–13.
"Thermocouple Amplifiers for Signal Conditioning", ©1961 by Axiomatic Technologies Corp., pp. 222–224.

\* cited by examiner

*Primary Examiner*—Christopher W. Fulton
(74) *Attorney, Agent, or Firm*—Dilworth & Barrese LLP

(57) ABSTRACT

A thermocouple tilt sensing device comprises a container being substantially gas-tight, a first sensing wire having a first and a second end, and a second sensing wire, having a first and a second end. The first end of the first sensing element is electrically connected to the first end of the second sensing wire thereby forming a thermocouple junction. A heater wire is disposed adjacent the thermocouple junction and is connected to an AC or DC power source. The heater wire provides thermal energy which induces a DC output voltage in the thermocouple. The first sensing wire, second sensing wire and the heater wire are disposed within the sealed container. An angle of a device provided with a thermocouple tilt sensing device is determined by measuring the output voltage from the thermocouple junction and comparing it to a known output voltage curve associated with the thermocouple tilt sensing device.

22 Claims, 7 Drawing Sheets

θ=0° TILT

θ=90° TILT

θ=180° TILT

θ=270° TILT

THERMOCOUPLE TILT SENSING DEVICE

BACKGROUND OF THE INVENTION

1. Field of the Invention

This invention relates generally to tilt sensors, and more particularly, to a thermocouple tilt sensor.

2. Description of the Related Art

Tilt sensors are generally known in the art. Specifically, Crossan, Jr. (U.S. Pat. No. 5,630,280) and Seipp, Jr. et al. (U.S. Pat. No. 5,852,878) disclose two common forms of electrolytic tilt sensors. Electrolytic tilt sensors are devices that change their electrical properties when tilted as a result of the interaction between an electrolyte and a plurality of electrodes contained therein. For example, known electrolytic tilt sensors provide an output voltage proportional to the tilt angle and a phase indicative of tilt direction when the sensor is configured as part of an appropriate electrical circuit. In addition, the tilt sensors can be configured to measure acceleration. In a tilt sensor configuration, the output voltage changes based on the change of impedance between the electrodes. The impedance between each electrode changes as the tilt angle changes and either more or less electrolytic fluid surrounds the electrodes.

Referring now to FIG. 1, there is shown a three-dimensional representation of a dual axis electrolytic tilt sensor 100 according to the prior art. Tilt sensor 100 is comprised of a cylindrical housing 120 that is partially filled with an electrolytic solution 140. Within cylindrical housing 120 are disposed a common electrode 150, a pair of first axis electrodes 160 and 170 and a pair of second axis electrodes 180 and 190, wherein common electrode 150, first axis electrodes 160, 170 and second axis electrodes 180, 190 are partially immersed in electrolytic solution 140.

When sensor 100 is tilted, the surface of electrolytic solution 140 remains in a horizontal level plane with respect to gravity, and electrolytic solution 140 shifts with respect to the electrodes thereby covering the electrodes with more or less electrolytic solution. The increase or decrease of immersion in the electrolytic solution produces a corresponding change in impedance between the electrodes. This change in impedance is measured using an appropriate electrical circuit and is used to determine the change in tilt.

Tilt sensing devices, originally conceived for weapons delivery and aircraft navigation, have found a wide variety of uses. This is primarily because the tilt sensor's voltage signal output may provide an input to a preprogrammed guidance or other system, or provide an indication of the tilt angle via an electrical signal at a location remote from the sensor.

It is also generally known that existing tilt sensors, such as the electrolytic tilt sensor, may consist of a tubular or channeled glass envelope partially filled with an electrolytic fluid having conducting metal electrodes (working and common electrodes) formed therein. The envelope configuration, construction, type of electrolyte, electrode arrangement and number of electrodes may be varied to provide the desired operating characteristics. However, it is also known that many of such existing tilt sensors produce less than accurate results and/or suffer from stability problems caused by, for example, reactions between the electrolytic fluid and the electrodes.

U.S. Pat. No. 5,581,034 to Dao et al. (Dao '034) and U.S. Pat. No. 3,241,374 to Menkis (Menkis '374) attempt to solve some of the problems associated with the use of electrolytic fluid by taking advantage of the convective properties of a heated gas.

Referring now to FIG. 2, there is shown a schematic diagram of a tilt sensor 200 according to Dao '034 which utilizes the properties associated with convective gas currents. Dao '034 discloses a convective accelerometer and inclinometer having two temperature sensing elements mounted within a sealed enclosure containing a gas. The application of heat to the gas within the enclosure by a heating element causes the gas to flow in a predetermined pattern in free convection. The less dense heated air rises and passes over sensing elements in the form of wires positioned throughout the enclosure. The resistance of a sensing element wire changes in proportion to the change in temperature, i.e. how much heated air passes over it. How much heated air passes over a sensing element is a function of tilt; thus, the resistive temperature coefficient change allows the tilt angle measurements to be performed with a corresponding electrical circuit. Convective accelerometer 200 is comprised of a sealed container 205, a first temperature sensing element 210, a second temperature sensing element 220, and a heating element 230. Heating element 230 heats a gas enclosed within sealed container 205 and the resistive temperature coefficient of the first and second temperature sensing elements 210 and 220 change in proportion to the amount of heat transferred from the heated gas. As noted, since heated air rises, the temperature sensing elements will receive more or less heat depending on whether they are rotated to a position that is partially above or partially below heating element 230. The change in the resistive temperature coefficient of the first and second temperature sensing elements 210 and 220 is measured and used to determine a corresponding tilt angle.

Referring now to FIG. 3, there is shown a schematic diagram of a device for sensing acceleration 300 according to Menkis '374. Menkis '374 discloses a device for sensing acceleration which is comprised of a heater located between at least two thermistors within a cylinder. When the cylinder is displaced, more or less heated gas passes over the thermistors located at the ends of the cylinder. The corresponding change in resistance of the thermistors is sensed by an appropriate electrical circuit and an output voltage is correlated to a tilt angle or acceleration.

The Menkis '374 device 300 is comprised of a sealed enclosure 310 having an elongated tubular member 320 disposed therein. A heater 330 is located midway within elongated tubular member 320. Elongated tubular member 320 has two openings located at either end. Within each opening is disposed a bead thermistor 340, 340a for sensing heat. When device 300 moves in the direction of travel 350, heat flows in the tube as a function of acceleration of the tube. More heat will be directed to bead thermistor 340a and less heat will be directed to bead thermistor 340. The resistance of bead thermistors 340, 340a change in proportion to the amount of heat received. Thus, the amount of acceleration can be determined based upon the amount of heat received at each bead thermistor 340, 340a as measured by the corresponding change in resistance. An appropriate electrical circuit connected to bead thermistors 340, 340a measure the change in resistance and determine the amount of acceleration. Unfortunately, bead thermistors 340, 340a also have a resistive temperature coefficient property that may vary widely and are affected by external temperature sources. The resistive temperature coefficient is a factor in producing inaccurate results. Therefore, there is a need in the art for a tilt sensor device which minimizes the reliance on temperature coefficient properties.

While some of the problems associated with electrolytic tilt sensors may be solved using a gas-based tilt sensor, such as Menkis '374 and Dao '034, the reliance on the resistive temperature coefficient of sensor wires in determining a tilt angle brings with it its own associated drawbacks. For example, sensor wires are more sensitive to changes in outside temperatures not associated with a change in angle or inclination. In addition, the sensor elements are constructed of very thin wire and frequently break. Also, the need for precisely balanced placement of the sensor wires, the need to measure angular movements of the housing, the need for reliable performance in various operating environments, and other factors provide additional problems.

Thermocouple devices do not rely on resistive temperature coefficient properties. A thermocouple generates an electromotive force ("emf") in response to a temperature difference between the two ends of a conductor. Thermocouples generate the emf because of several thermoelectric principles. One principle, known as the Peltier effect, consists of the generation or absorption (depending on the direction of the current (i)) of heat, at a rate Q, at a junction between two different conductors when a current flows through them according to the equation: Q=II i, where II is the Peltier coefficient. A second thermoelectric principle applicable to thermoelectric devices states that a thermoelectric voltage dE in an open circuit consisting of two different conductors is equal to the temperature difference dT between their ends multiplied by a thermal emf coefficient ($a_{1-2}$) between the given conductors according to the equation: $dE=a_{1-2} dT$. It has also been shown that an emf can be produced in a thermocouple that is the result of a temperature gradient between the ends of one conductor and not as the result of a temperature difference between the ends of the conductors, i.e. Hot and Cold Junctions. That is, if the ends of a conductor are at the same temperature and a warmer or colder region is located between them, a potential difference will appear between the ends of the thermocouple when the wanner or colder region is closer to one of the ends of the conductor. (See, *Semiconductor and Thermoelements Thermoelectric Cooling*, A.F. Ioffe, ©1957 by Infosearch, Ltd., Pages 4–13).

Still another principle affecting the output voltage of a thermocouple junction is discussed in the case where the two sensor wires are comprised of dissimilar semiconductor materials. It has been found that thermocouples made of both regular metals and semiconductors display a polarity with respect to the thermoelectric voltage generated as a result of a temperature difference between the ends of the conductors. When an external load resistance is connected between the ends of the conductors that form the Cold Junction, the Cold Junction end of the first conductor has a negative charge while the Cold Junction end of the second conductor has a positive charge. Thus, the Hot Junction end of the first conductor may be referred to as the positive conductor while the Hot Junction end of the second conductor may be referred to as the negative conductor. (See, *Thermocouple Amplifiers for Signal Conditioning*, ©1961 by Axiomatic Technologies Corp., Pages 222–224).

As a result, it would be highly advantageous to provide an economical tilt sensing device which substantially improves operational accuracy and stability as compared to prior art devices using the principles associated with a thermocouple.

SUMMARY OF THE INVENTION

It is an object of the present invention to provide a thermocouple tilt sensing device that makes use of a controlled thermal convection gradient within a sealed housing.

It is an additional object of the present invention to provide a thermocouple tilt sensing device that uses a thermocouple to detect angular changes.

It is another object of the present invention to provide a thermocouple tilt sensing device that is superior to existing tilt sensors that rely on electrical resistance temperature coefficient properties to determine tilt angle.

It is another object of the present invention to provide a thermocouple tilt sensing device which operates using either alternating current (AC) or direct current (DC).

It is a further object of the present invention to provide a thermocouple tilt sensing device that overcomes the disadvantages associated with electrolytic tilt sensors, namely, in the use of electrolytic fluids.

It is yet another object of the present invention to provide a thermocouple tilt sensing device that is reliable, accurate, durable, and inexpensive to manufacture.

To achieve the above objects of the present invention there is provided a thermocouple tilt sensing device having at least two sensor electrodes and at least two heater wire electrodes enclosed in a sealed housing. At least two sensor wires constructed of dissimilar metals are bonded together at one end to form a thermocouple junction. The opposite ends of the two sensor wires are electrically connected to an end of one of the at least two sensor electrodes. In addition, at least one heater wire is connected between the at least two heater wire electrodes. The center point of the heater wire may be physically but not electrically connected to the thermocouple junction using a ceramic material.

The sensor electrodes, heater electrodes, sensor wires and heater wires are enclosed in a housing which is filled with a gas. In a preferred embodiment the housing is filled with ambient air, however, additional gases such as hydrogen, helium, or argon may also be used.

When a current is applied to the heater wire, the heater wire becomes hot and warms the gases surrounding it. The gases surrounding the heater wire expand with the increased heat. The heated gas becomes less dense and is quickly replaced with cooler, more dense air. The resulting displacement forces the warm air to rise above the cooler, denser air resulting in convection flow. The thermocouple formed from two dissimilar metals, produces a DC voltage that is proportional to the difference in temperature between the thermocouple Hot Junction and the Cold Junction located at the ends of the two thermocouple wires where they are attached to the terminal posts. In addition, a DC voltage can be generated when the Hot and Cold Junctions are at the same temperature and there is a temperature gradient between the Hot and Cold Junctions. The terminal posts are thereafter attached to electrical lead wires. Depending upon the degree of tilt, the thermocouple junction will receive more or less heated air and produce an output voltage accordingly. This output voltage, when applied to the appropriate circuit, can be translated into a corresponding degree of tilt.

BRIEF DESCRIPTION OF THE DRAWINGS

These and other objects and features of the present invention will become apparent from the following detailed description considered in connection with the accompanying drawings in which.

DETAILED DESCRIPTION OF PREFERRED EMBODIMENTS

Figure 1:
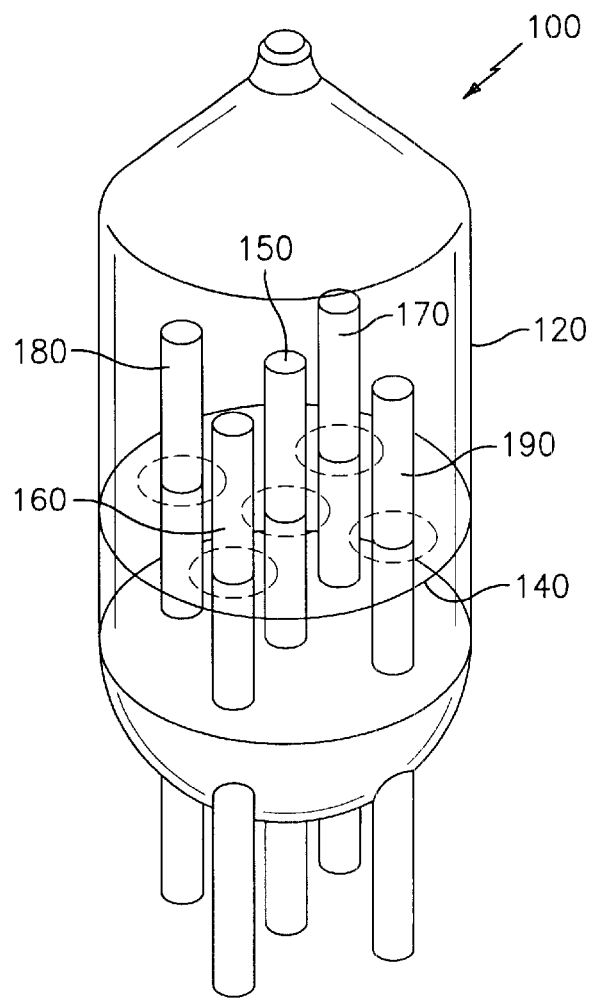
FIG. 1 is a perspective view of a dual axis electrolytic tilt sensor according to the prior art.
Figure 2:
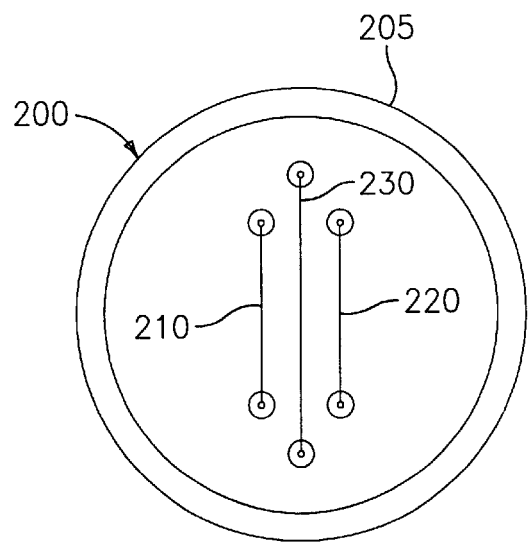
FIG. 2 is a top schematic view of a tilt sensor using convective currents according to the prior art.
Figure 3:
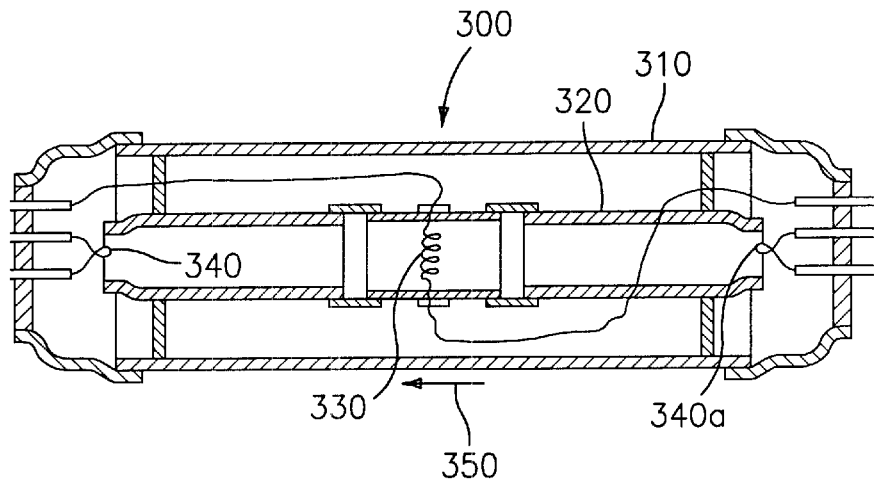
FIG. 3 is a cross-sectional view of an accelerometer using bead thermistors according to the prior art.
Figure 4:
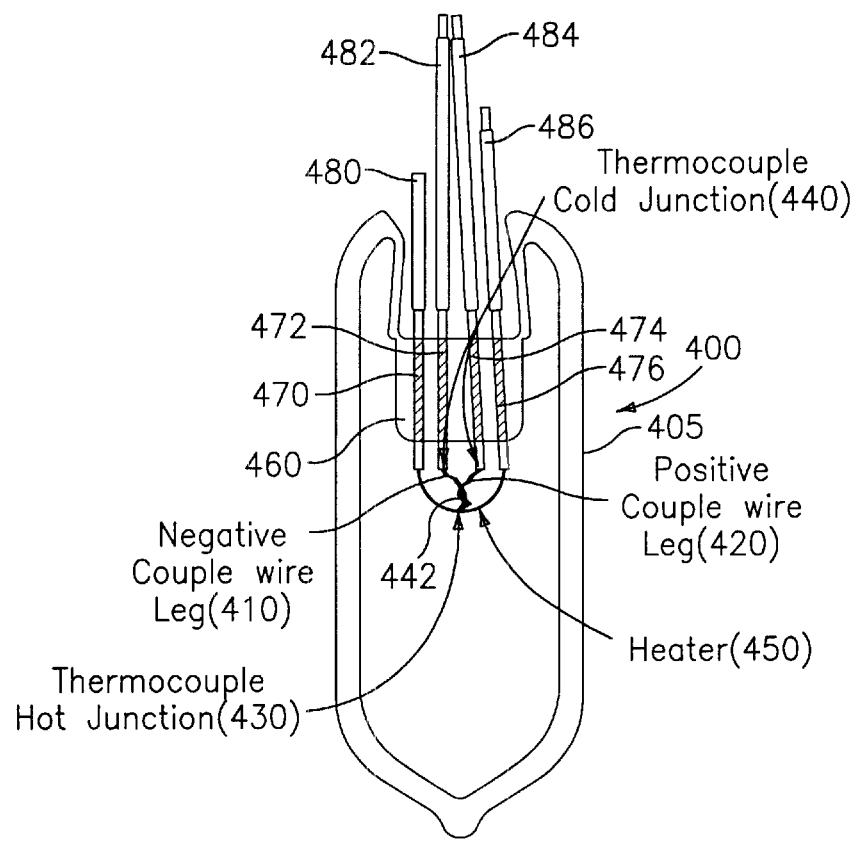
FIG. 4 is a cross-sectional view of a thermocouple tilt sensing device according to an embodiment of the present invention.

Referring to FIG. 4, there is shown a cross-sectional schematic view of a thermocouple tilt sensing device 400 according to an embodiment of the present invention. Thermocouple tilt sensing device 400 is comprised of a sealed enclosure 405 filled with a gas, and a first sensing element 410 and a second sensing element 420 located within sealed enclosure 405. Sealed enclosure 405 may be fabricated from any suitable material including, but not limited to, glass, cerarmic, metal or plastic. Since the gas within sealed enclosure 405 may be ambient air, sealed enclosure 405 may be fabricated from plastics without concern for their porosity. In addition, since sealed enclosure 405 can be manufactured out of metal, an additional insulating material may surround the exterior of enclosure 405 to reduce the amount of thermal loss from the device and minimize the effect of the surrounding environment on the internal components of the sensor.

First sensing element 410 and second sensing element 420 are preferably made of dissimilar metals and are electrically connected to each other and form a thermocouple junction 430. Thermocouple junction 430 is also referred to as the Hot Junction 430, and these terms can be used interchangeably throughout the specification. The opposite end of elements 410 and 420 are electrically connected to a plurality of termination posts 472 and 474, respectively. The junction between wire 410 and post 472 and wire 420 and post 474 form a thermocouple Cold Junction 440. A heater element 450 is located within sealed enclosure 405 and is electrically connected, at each end thereof, to termination posts 470 and 476 respectively. A thermocouple junction extension wire 442 may be electrically connected to thermocouple junction 430 and physically connected but not electrically connected to heater element 450. In the preferred embodiment, thermocouple junction extension wire 442 is physically connected to a midpoint of heater element 450 and may extend beyond heater element 450 using a ceramic bead. It should be noted that thermocouple junction extension wire 442 maybe physically connected to any point on heater element 450 depending upon the desired output characteristics.

In a preferred embodiment, heater element 450 is fabricated using 0.002" diameter Chromel wire. In an additional embodiment of the present invention, 0.0005" diameter Evanohm wire may be used for heater element 450. In this case, however, thermocouple junction 430 may be bonded with a ceramic type bead (approximately 0.0005" inch in diameter) directly to the center point of Evanohm heater element 450. In addition, AC and DC voltage may be applied to heat heater element 450 while the thermocouple generates its own DC output voltage signal according to the principles of a thermocouple.

In the case where sealed enclosure 405 is formed of glass, termination posts 470–476 are secured in a glass stem platform 460 and extend outside sealed housing 405. The ends of termination posts 470, 472, 474, 476, opposite the ends connected to the heater and sensor wires, form a plurality of electrical contact points 480, 482, 484, 486, respectively. Contact points 480 and 486 are used to electrically connect heater 450 to a power supply, and contact points 482 and 484 are used to electrically connect thermocouple 430 to an electrical circuit to measure output voltage.

Figure 5:
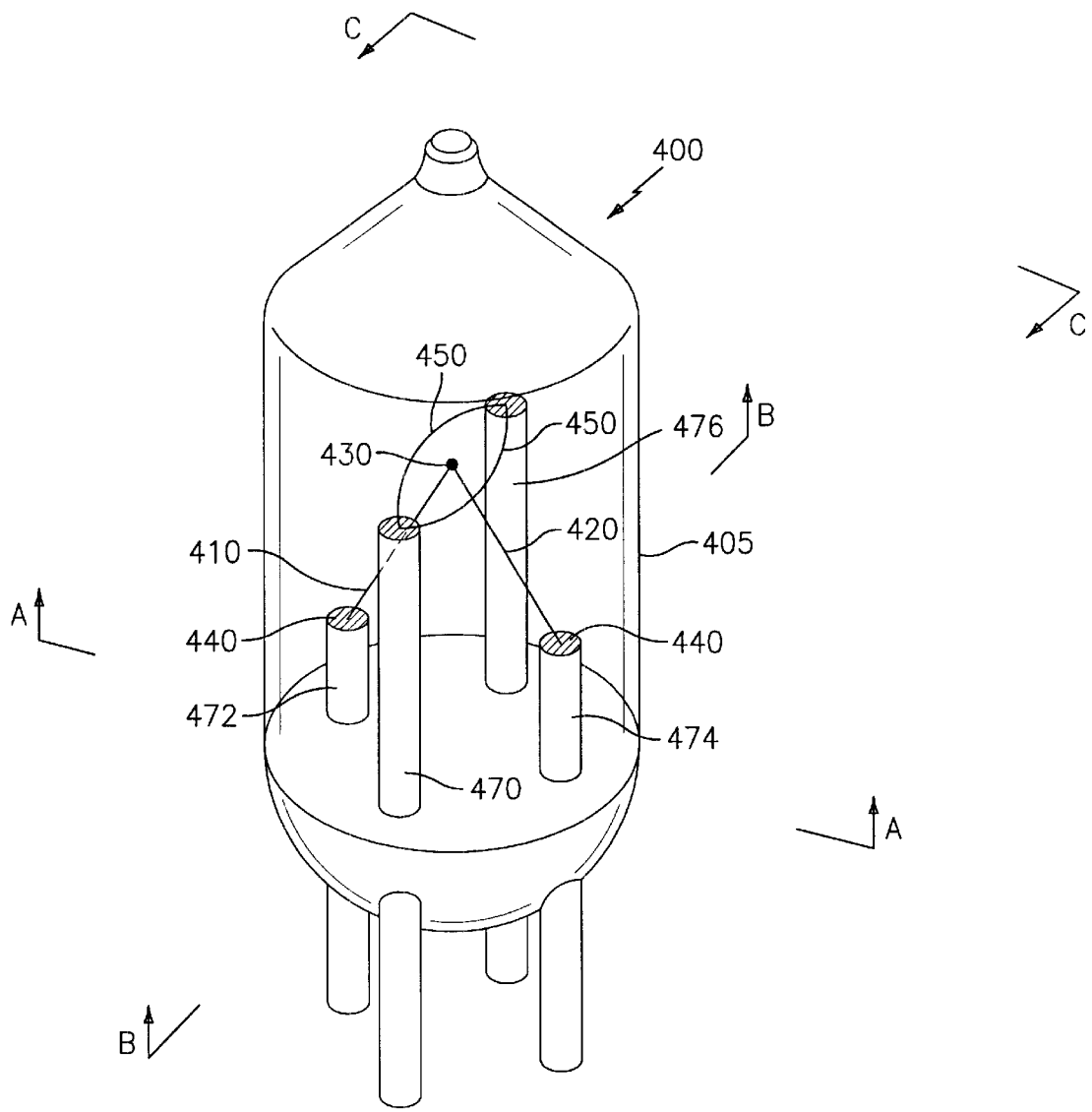
FIG. 5 is a perspective view of a thermocouple tilt sensing device according to a preferred embodiment of the present invention.

FIG. 5 is a perspective view of a thermocouple tilt sensing device 400 according to a preferred embodiment of the present invention. In the preferred embodiment housing 405 is formed of a metallic material and termination posts 470 and 476 extend upward to a plane substantially parallel and approximately equal to thermocouple junction 430. A pair of heater wires 450 extend from termination post 470 to post 476 and are disposed on either side of Hot Junction 430. It should be noted that the plane heater wires 450 are disposed in may vary above or below Hot Junction 430 to yield different output results.

In operation, a thermocouple is a junction formed by two dissimilar metals, alloys or semiconductors. FIG. 6a discloses a diagrammatic cross-sectional view of the thermocouple tilt sensing device according to FIG. 5 taken along parallel reference line A—A. The junction between the two dissimilar metals is referred to as the test junction or Hot Junction 430 and is placed where a temperature is to be measured. The opposite ends of the thermocouple sensor wires are normally maintained at a constant reference temperature, and are commonly referred to as a Cold Junction 440. Heater elements 450 provide thermal energy and may be disposed in a plane parallel and slightly below Hot Junction 430. Heater elements 450 are connected to a power supply to provide the necessary current to produce thermal energy. The power supply may be AC or DC and may also be a battery.

When the reference temperature at the Cold Junction 440 is different from the temperature at the Hot Junction 430, a voltage (referred to as an electromotive force (emf)) is created between the two ends of the thermocouple wires. The emf is proportional to the difference in temperature between the Hold Junction and the Cold Junction; thus, the measured emf can be used to determine the temperature at the Hot Junction. A voltmeter can be used to measure the emf between the first 410 and the second 420 sensing elements, and, indirectly measure the temperature differential between the Hot and Cold Junctions. The measured emf is then compared to a known output voltage curve associated with the thermocouple device and an associated angle of the device is determined.

Figure 6B:
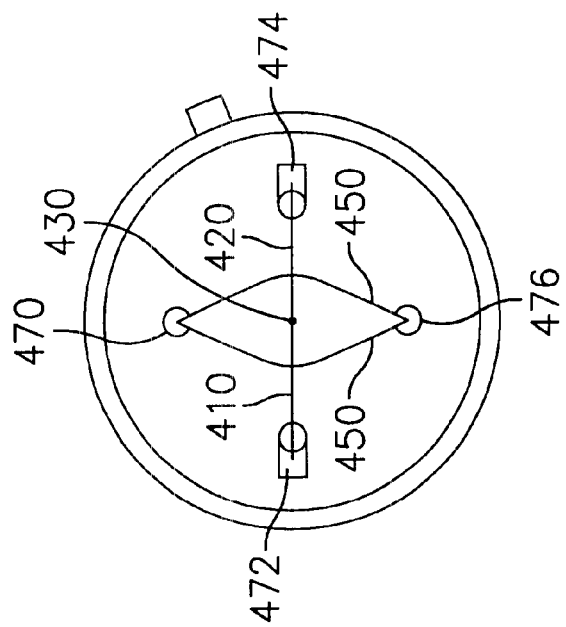
FIG. 6b is a cross-sectional view of the thermocouple tilt sensing device according to FIG. 5 taken along reference line C—C.
Figure 6A:
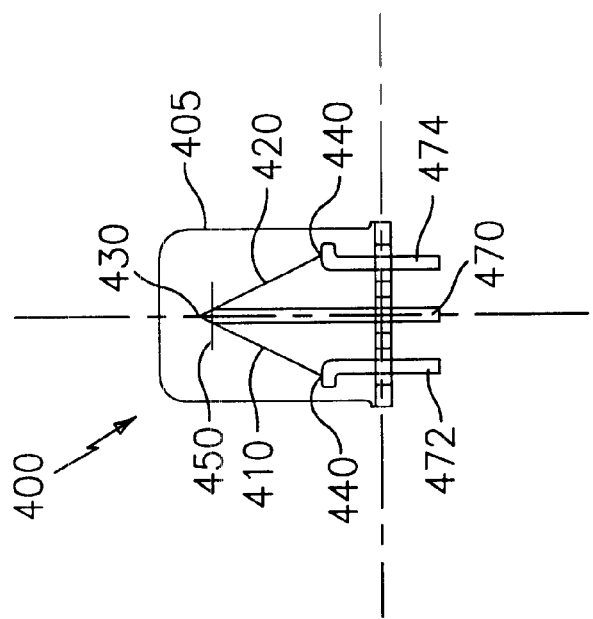
FIG. 6a is a diagrammatic cross-sectional view of the thermocouple tilt sensing device according to FIG. 5 taken along parallel reference line A—A.

FIG. 6b discloses a cross-sectional view of the thermocouple tilt sensing device according to FIG. 5 taken along reference line C—C. In the preferred embodiment, first element 410 is fabricated from 0.002" diameter Chromel wire and second element 420 is made from 0.002" diameter Constantan wire. Heater elements 450 are fabricated from 0.002" diameter Chromel wire and are disposed on either side of Hot Junction 430. Additional examples of metals that may be used in a thermocouple include iron/Constantan, copper/Constantan, and Chromel/aluminel. It is to be understood that those skilled in the art may select other metal combinations to achieve a desired result.

The angle of an object fitted with a thermocouple tilt sensing device as disclosed in FIG. 5 is determined by applying an electrical current to the ends of heater element 450, measuring an output voltage generated between the ends of the Cold Junction 440 and comparing the measured output voltage with a known output curve of the thermocouple tilt sensing device. FIGS. 7a–7d disclose diagrammatic cross-sectional views of the thermocouple tilt sensing device of FIG. 5 taken along parallel reference line A—A as device 400 is rotated counterclockwise.

Figure 7A:
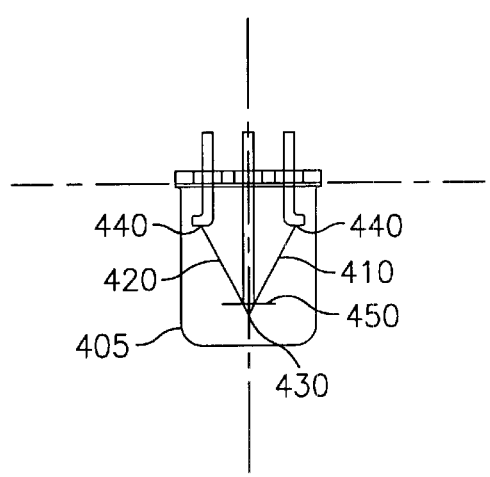
FIG. 7a is a diagrammatic cross-sectional view of the thermocouple tilt sensing device of FIG. 5 taken along line A—A, in which the tilt sensing device is in an inverted state corresponding to 0 degrees of tilt.

FIG. 7a is a diagrammatic cross-sectional view of the thermocouple tilt sensing device of FIG. 5 in an inverted state corresponding to θ=0 degrees of tilt. Recall the principles governing the operation of a thermocouple discussed above, i.e. a temperature differential between the Hot 430 and Cold 440 Junctions induces an emf at the Cold Junction 440 ends; heating one of the two sensing elements 410, 420 individually while Hot 430 and Cold 440 Junctions are at a same temperature induces an emf at the Cold Junction 440 ends; and the magnitude and sign of the output voltage for each sensing element 410, 420 varies in accordance with the polar nature of thermocouples.

At zero degrees of tilt, the thermal energy from heater elements 450 rises and envelops Cold Junction 440 and the first and second sensing elements 410, 420. Since Hot Junction 430 is located slightly below heating elements 450, Hot Junction 430 receives less convective thermal energy than Cold Junction 440 does. As device 400 is rotated from zero degrees, in a counterclockwise direction, until approximately 90 degrees of tilt, the voltage output between the ends of Cold Junction 440 increases. This is the result of more thermal energy surrounding positive first sensing element 410 and an increase in thermal energy at Hot Junction 430.

Figure 7B:
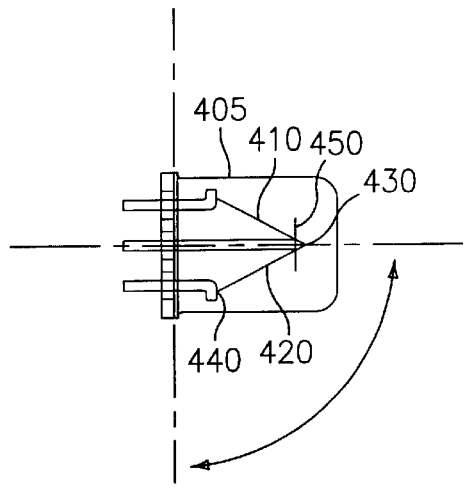
FIG. 7b is a diagrammatic cross-sectional view of the thermocouple tilt sensing device of FIG. 5 taken along line A—A, in which the tilt sensing device is in a horizontal state corresponding to 90 degrees of tilt.

FIG. 7b is a diagrammatic cross-sectional view of the thermocouple tilt sensing device of FIG. 5 in a horizontal state corresponding to 90 degrees of tilt. At approximately 90 degrees of tilt, a maximum output voltage is produced because there is a difference in temperature between Hot Junction 430 and Cold Junction 440, and first sensing element 410 receives more thermal energy than second sensing element 420. The air temperature above the horizontal plane is warmer than the temperature below the plane, thus, first sensing element 410, in accordance with the polar nature of thermoelectric devices, will induce a positive voltage. In addition, Cold Junction 440 of first sensing element 410 lies above the horizontal plane and receives more thermal energy than the Cold Junction 440 of second sensing element 420 further contributing to the output of first sensing element 410. This positive voltage, combined with the potential developed between Hot Junction 430 and Cold Junction 440 yields an increase in output voltage.

Figure 7C:
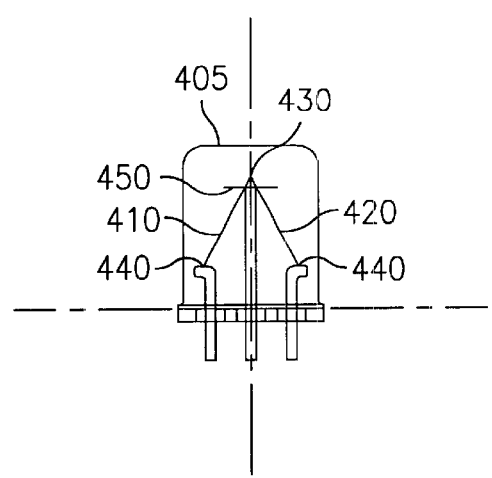
FIG. 7c is a diagrammatic cross-sectional view of the thermocouple tilt sensing device of FIG. 5 taken along line A—A, in which the tilt sensing device is in a vertical state corresponding to 180 degrees of tilt.

FIG. 7c is a diagrammatic cross-sectional view of the thermocouple tilt sensing device of FIG. 5 in a vertical state corresponding to 180 degrees of tilt. Further rotation of device 400 from 90 degrees to 180 degrees results in a decrease in output voltage. This decrease in output voltage is due to the shifting of thermal convection energy and a balancing of heat received by first sensing element 410 and second sensing element 420. At 180 degrees, the convective thermal energy rises vertically, and the voltage produced by second sensing element 420 negates a portion of the voltage produced by first sensing element 410. In addition, both ends of Cold Junction 440 receive the same amount of thermal energy. Thus, the voltage produced is the result of the difference in temperatures between the Hot Junction 430 and Cold Junction 440 and the decreasing amount of heat surrounding first sensing element 410.

Figure 7D:
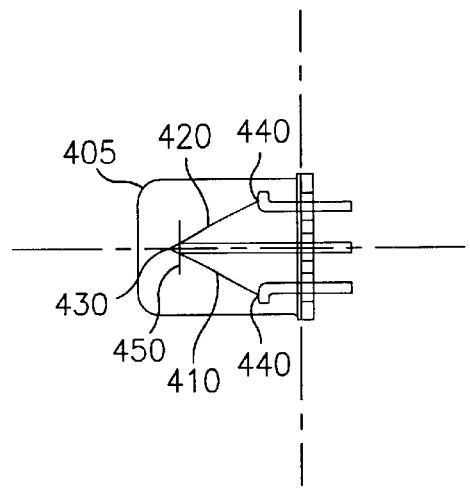
FIG. 7d is a diagrammatic cross-sectional view of the thermocouple tilt sensing device of FIG. 5 taken along line A—A, in which the tilt sensing device is in a horizontal corresponding to 270 degrees of tilt.

FIG. 7d is a diagrammatic cross-sectional view of the thermocouple tilt sensing device of FIG. 5 in a horizontal state corresponding to 270 degrees of tilt. Further rotation of device 400 from 180 degrees to 270 degrees results in a further decrease in output voltage. In addition, a minimum output voltage is resized at approximately 270 degrees. This is due in part to the polarity of the thermoelectric voltage produced where a maximum amount of thermal energy flows over negative wire 420. The air temperature above the horizontal plane is warmer than the temperature below the plane, thus, second sensing element 420, in accordance with the polar nature of thermoelectric devices, will induce a negative voltage. In addition, Cold Junction 440 of second sensing element 420 lies above the horizontal plane and receives more thermal energy than the Cold Junction 440 of first sensing element 410 further contributing to the output of second sensing element 420. This negative voltage, combined with the potential developed between Hot Junction 430 and Cold Junction 440 yields a decrease in output voltage. In actuality, the negative output voltage of second sensing element 420 is greater than the output voltage generated between Hot Junction 430 and Cold Junction 440 thus producing a negative net output voltage.

Figure 8:
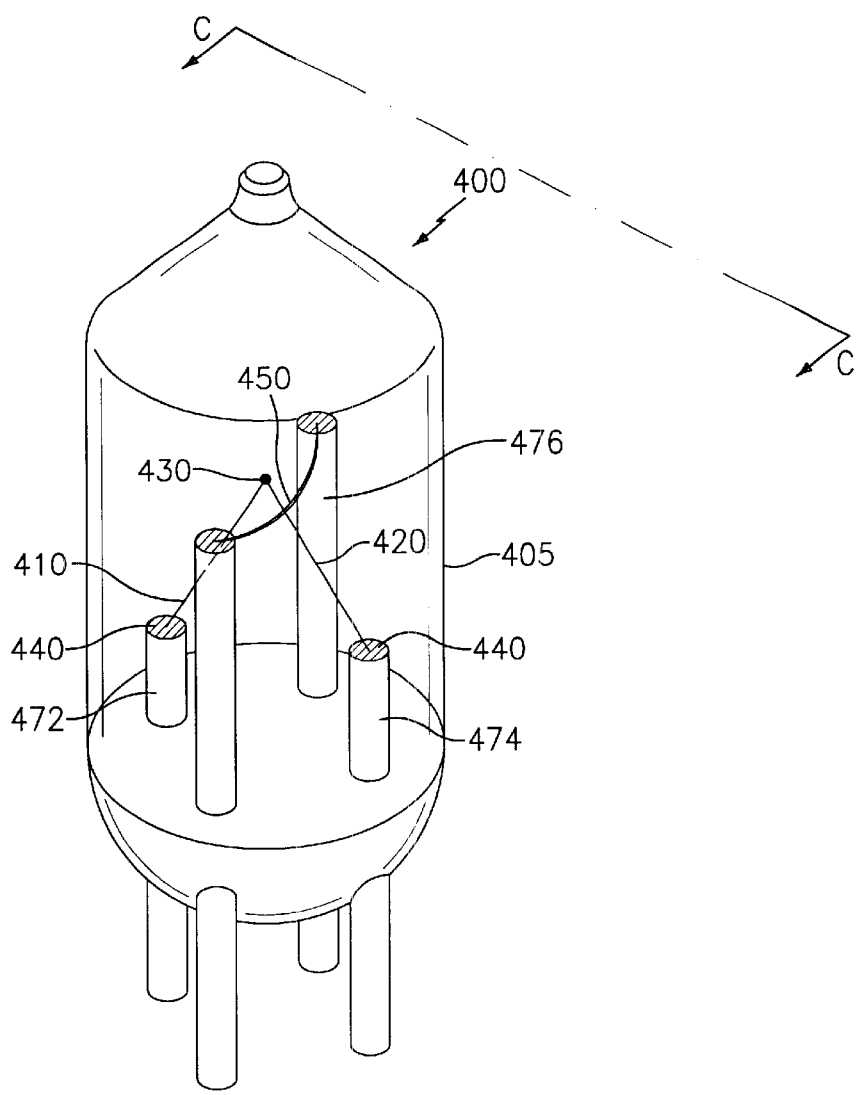
FIG. 8 is a perspective view of a thermocouple tilt sensing device according to an additional embodiment of the present invention having at least one heater element disposed on only one side of the thermocouple.

Turning now to FIG. 8, FIG. 8 shows a perspective view of a thermocouple tilt sensing device according to an additional embodiment of the present invention having at least one heater element disposed on only one side of the thermocouple. It is understood that many modifications pertaining to the number and placement of heater elements 450 may be made to the present invention in an effort to provide a more accurate or stable output voltage without departing from the spirit and scope of the present For example, an additional embodiment may be configured having more than one heater element disposed on a single side of the Hot Junction 430, or located above or below Hot Junction 430.

Figure 9:
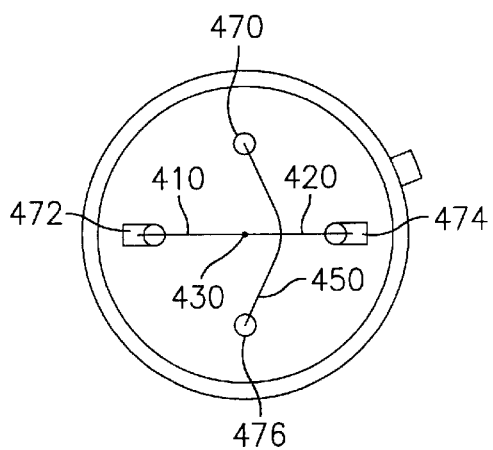
FIG. 9 is a cross-sectional view of the thermocouple tit sensing device taken along line C—C according to FIG. 8.

FIG. 9 is a cross-sectional view of the thermocouple tilt sensing device taken along line C—C according to FIG. 8. The location of heater wire 450 is clearly marked on a right side of Hot Junction 430. In this position, a higher output voltage is produced, however, the sinusoidal characteristic and sensitivity of the device is reduced. The behavior of the thermocouple tilt sensing device according to the preferred and additional embodiments of the present invention is best described by way of example.

EXAMPLE 1

A thermocouple tilt sensing device is constructed according to the preferred embodiment of the present invention as disclosed in FIG. 5. The device is comprised of two 0.002" diameter Chromel wire heater elements, and a thermocouple comprised of a 0.002" diameter Chromel first sensing element and a 0.002" diameter Constantan second sensing element. The heater elements and the thermocouple are located within a sealed housing constructed of a metallic can filled with air. In addition, 0.2 mA of current is applied to the heater elements. The temperature within the sensor is allowed to reach equilibrium in order to determine a stable output voltage. The voltage applied to the heater may be either AC or DC. The output voltage is DC and is measured in mV. Table 1 lists the emf produced when the device is rotated in the parallel direction where the parallel direction refers to the counter-clockwise rotation within the plane of the sensor wires.

TABLE 1

| Angle (degrees) | Parallel Direction (m V) DC | Angle (degrees) | Parallel Direction (m V) DC |
|---|---|---|---|
| 0 | .068 | 190 | .063 |
| 10 | .079 | 200 | .051 |
| 20 | .091 | 210 | .039 |
| 30 | .103 | 220 | .025 |
| 40 | .117 | 230 | .019 |
| 50 | .125 | 240 | .009 |
| 60 | .135 | 250 | .002 |
| 70 | .142 | 260 | −.002 |
| 80 | .147 | 270 | −.003 |
| 90 | .150 | 280 | −.004 |
| 100 | .148 | 290 | −.003 |
| 110 | .148 | 300 | .003 |
| 120 | .143 | 310 | .012 |
| 130 | .131 | 320 | .020 |
| 140 | .125 | 330 | .033 |
| 150 | .116 | 340 | .043 |
| 160 | .104 | 350 | .056 |
| 170 | .091 | 360 | .068 |
| 180 | .076 | | |

NOTE: Zero degrees represents the inverted state of the thermocouple tilt sensing device.

Figure 10:
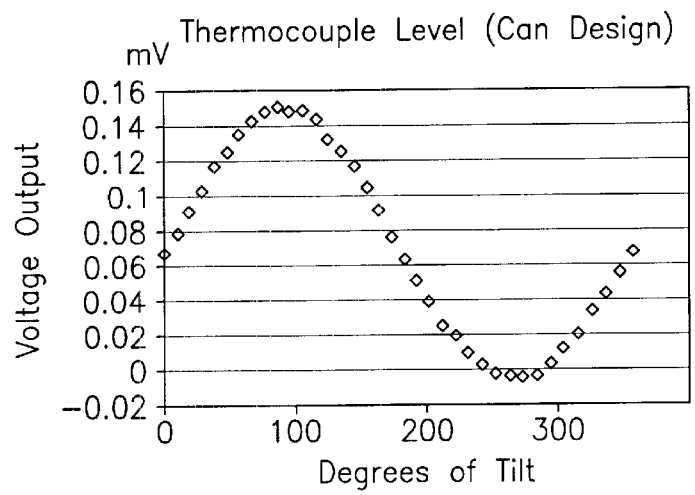
FIG. 10 is a graph illustrating the relationship between tilt angle and output voltage according to the preferred embodiment of FIG. 5 with a 0.2 mA heater element current.

FIG. 10 discloses a graph illustrating the relationship between tilt angle and output voltage according to the preferred embodiment having a 0.2 mA heater element current.

It is evident from the data of Table 1 and corresponding graph illustrated in FIG. 10, that output voltage increases until 90 degrees and then decreases until approximately 270–280 degrees. Further tilting of the device after 270 degrees results in an increase in output voltage. In addition, the output voltage is a negative value at approximately 270 degrees of tilt. This change in the output voltage is related to the change in temperatures associated with Hot Junction 430 and Cold Junction 440 and first sensing element 410 and second sensing element 420.

It should be noted that one skilled in the art may modify the shape of sealed enclosure 405, the composition of gas disposed within sealed enclosure 405, and the location of thermocouple junction 430 with respect to heater element 450 to produce a different output voltage curve corresponding to the degree of tilt. In addition, a minimum output voltage is noted at 280 degrees instead of 270 degrees. This may be due to minor variations in the location of the heater elements 450 with respect to Hot Junction 430.

EXAMPLE 2

A thermocouple tilt sensing device is constructed according to an additional embodiment of the present invention according to FIG. 8 wherein a heater element 450 is located on one side of the thermocouple junction. The device is comprised of a thermocouple comprised of a 0.002" diameter Chromel first sensing element, and a 0.002" diameter Constantan second sensing element and a 0.002" diameter Chromel wire heater element disposed on one side of the thermocouple junction. The heater element and the thermocouple are located within a sealed housing constructed of a metallic can filled with air. In addition, 0.3 mA of current is applied to the heater element. The temperature within the sensor is allowed to reach equilibrium in order to determine a stable output voltage. The voltage applied to the heater may be either AC or DC. The output voltage is DC and is measured in mV. Table 2 lists the emf produced when the device is rotated in the parallel direction where the parallel direction refers to the counterclockwise rotation within the plane of the sensor wires.

TABLE 2

| Angle (degrees) | Parallel Direction (m V) DC | Angle (degrees) | Parallel Direction (m V) DC |
|---|---|---|---|
| 0 | 4.1 | 190 | 3.66 |
| 10 | 4.17 | 200 | 3.66 |
| 20 | 4.23 | 210 | 3.64 |
| 30 | 4.28 | 220 | 3.60 |
| 40 | 4.32 | 230 | 3.56 |
| 50 | 4.35 | 240 | 3.54 |
| 60 | 4.38 | 250 | 3.53 |
| 70 | 4.4 | 260 | 3.54 |
| 80 | 4.42 | 270 | 3.55 |
| 90 | 4.42 | 280 | 3.61 |
| 100 | 4.42 | 290 | 3.64 |
| 110 | 4.36 | 300 | 3.69 |
| 120 | 4.3 | 310 | 3.75 |
| 130 | 4.23 | 320 | 3.80 |
| 140 | 4.18 | 330 | 3.88 |
| 150 | 4.12 | 340 | 3.93 |
| 160 | 4.05 | 350 | 3.98 |
| 170 | 3.96 | 360 | 4.07 |
| 180 | 3.85 | | |

NOTE: Zero degrees represents the inverted state of the thermocouple tilt sensing device.

Figure 11:
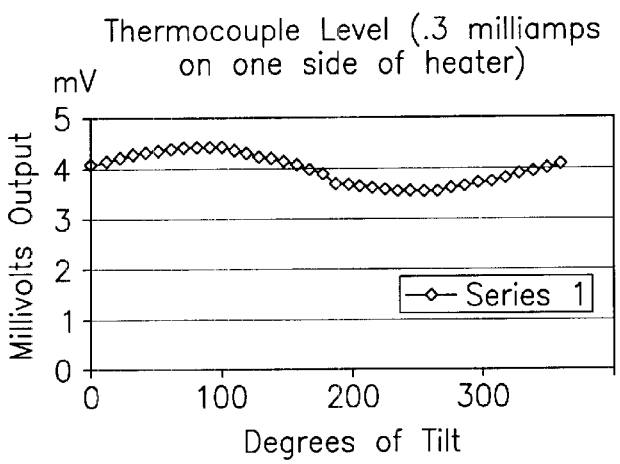
FIG. 11 is a graph illustrating the relationship between tilt angle and output voltage according to the embodiment of FIG. 8 with a 0.3 mA heater element current.

FIG. 11 discloses a graph illustrating the relationship between tilt angle and output voltage according to the preferred embodiment having a 0.3 mA heater element current.

It is evident from the data of Table 2 and corresponding graph illustrated in FIG. 11, that output voltage increases until 90 degrees and then decreases until approximately 250–260 degrees. While a minimum output voltage is noted at 250–260 degrees instead of 270 degrees, this may be due to minor variations in the location of the heater elements 450 with respect to Hot Junction 430. Further tilting of the device after 270 degrees results in an increase in output voltage. The higher heater element current shows a higher output voltage but also shows less sensitive rotational output voltage variation characteristics.

EXAMPLE 3

A thermocouple tilt sensing device is constructed according to an additional embodiment of the present invention according to FIG. 8 wherein a heater element 450 is located on one side of Hot Junction 430. The device is comprised of a 0.002" diameter Chromel wire heater element, and a thermocouple comprised of a 0.002" diameter Chromel first sensing element, and a 0.002" diameter Constantan second sensing element. The heater element and the thermocouple are located within a sealed housing constructed of a metallic can filled with air. In addition, 0.58 mA of current is applied to the heater element. The temperature within the sensor is allowed to reach equilibrium in order to determine a stable output voltage. The voltage applied to the heater may be either AC or DC. The output voltage is DC and is measured in mV. Table 3 lists the emf produced when the device is rotated in the parallel direction where the parallel direction refers to the counterclockwise rotation within the plane of the sensor wires.

TABLE 3

| Angle (degrees) | Parallel Direction (m V) DC | Angle (degrees) | Parallel Direction (m V) DC |
|---|---|---|---|
| 0 | 13.83 | 190 | 12.22 |
| 10 | 13.99 | 200 | 11.91 |
| 20 | 14.19 | 210 | 11.71 |
| 30 | 14.36 | 220 | 11.57 |
| 40 | 14.49 | 230 | 11.50 |
| 50 | 14.50 | 240 | 11.50 |
| 60 | 14.67 | 250 | 11.47 |
| 70 | 14.73 | 260 | 11.43 |
| 80 | 14.74 | 270 | 11.51 |
| 90 | 14.76 | 280 | 11.69 |
| 100 | 14.71 | 290 | 11.85 |
| 110 | 14.66 | 300 | 12.13 |
| 120 | 14.47 | 310 | 12.44 |
| 130 | 14.29 | 320 | 12.72 |
| 140 | 14.04 | 330 | 12.97 |
| 150 | 13.74 | 340 | 13.24 |
| 160 | 13.37 | 350 | 13.49 |
| 170 | 12.96 | 360 | 13.7 |
| 180 | 12.58 | | |

NOTE: Zero degrees represents the inverted state of the thermocouple tilt sensing device.

Figure 12:
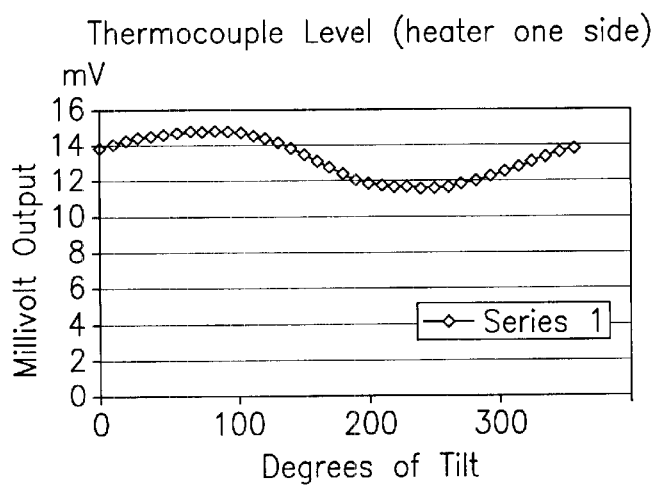
FIG. 12 is a graph illustrating the relationship between tilt angle and output voltage according to the embodiment of FIG. 8 with a 0.58 mA heater element current.

FIG. 12 discloses a graph illustrating the relationship between tilt angle and output voltage according to the additional embodiment having a 0.58 mA heater element current. The increased input heater current coupled with the heater element on one side of the thermocouple showed an improved rotational sinusoidal output voltage characteristic over the similar thermocouple heater arrangement.

EXAMPLE 4

In an effort to demonstrate the polar nature of the thermal heating of a positive first conductor versus the heating of a negative second conductor of a thermocouple, the following experiment was performed.

A tungsten/copper thermocouple junction was prepared by welding the wires (copper 0.020" diameter and tungsten 0.020" diameter) together to form a Hot Junction. The opposite ends of the first and second conductors were attached to a voltmeter and formed a Cold Junction.

The Hot Junction of the thermocouple was then heated directly with a heat gun and the DC output voltage measured on the voltmeter ranged form 1 to 8 volts DC.

The negative wire (Copper) 420 was then directly heated for a period of 1 minute and the DC output voltage measured on the volt meter ranged from 0.2 to 0.9 volts DC.

The positive wire (Tungsten) 410 was then directly heated for a period of 1 minute and the DC output voltage measured on the voltmeter ranged from 1 to 2 volts DC.

Therefore, the output of a thermocouple device is not only the result of the temperature difference between the Hot and Cold Junction, but also a result of which conductor, i.e. first or second, receives more or less thermal energy.

While several of the embodiments of the present invention have been shown and described, it is understood that many changes and modifications may be made thereunto without department from the spirit and scope of the present invention as defined in the appended claims.

What is claimed is:

1. A thermocouple tilt sensing device comprising:

a container;

a first sensing element having a first end and a second end disposed in said container;

a first electrically conductive termination post extending between the inside and the outside of said container, the first electrically conductive termination post electrically interfacing with the second end of the first sensing element;

a second sensing element having a first end and a second end disposed in said container;

a second electrically conductive termination post extending between the inside and the outside of said container, the second electrically conductive termination post electrically interfacing with the second end of the second sensing element;

a thermocouple junction comprised of the first end of the first sensing element electrically connected to the first end of the second sensing element;

a heater element having a first end, a center region and a second end disposed within said container;

a third electrically conductive termination post extending between the inside and the outside of said container, the third electrically conductive termination post electrically interfacing with the first end of the heater element; and a fourth electrically conductive termination post extending between the inside and the outside of said container, the fourth electrically conductive termination post electrically interfacing with the second end of the heater element.

2. The claim according to claim 1, wherein said first and said second sensing elements are formed of dissimilar materials.

3. The claim according to claim 1, wherein at least one of said first and said second sensing elements are formed of a semiconductor material.

4. The claim according to claim 1, wherein said first sensing element is formed using 0.002" diameter Chromel wire and said second sensing element is formed using 0.002" diameter Constantan wire.

5. The claim according to claim 1, further comprising a thermocouple extension element, electrically connected to said thermocouple junction and physically connected to said heater element via a ceramic bead.

6. The claim according to claim 5, wherein said thermocouple extension element is 0.002" in diameter and attached to said center region on said heater element.

7. The claim according to claim 5, wherein said thermocouple extension element is made of a material selected from one of the material of said first sensing element or the material of said second sensing element.

8. The claim according to claim 1, wherein said container is filled with a gas.

9. The claim according to claim 1, wherein said container is filled with air.

10. The claim according to claim 1, wherein said heater element is made from a 0.002" diameter Chromel.

11. The claim according to claim 1, wherein said heater element is made from a 0.0005" diameter Evanohm wire.

12. The claim according to claim 1, wherein said thermocouple junction is bonded with a ceramic type bead to said center region of said heater element.

13. The claim according to claim 1, wherein said first through said fourth termination posts extend through a base of said container, said base of said container forming a substantially gastight seal with said termination posts.

14. The claim according to claim 1, wherein said container is made from ceramic, glass, metal or plastic.

15. The claim according to claim 1, wherein said container is formed from a metallic transistor can.

16. The claim according to claim 1, wherein said container is filled with a gas such as hydrogen, helium or argon.

17. A thermocouple tilt sensing device comprising:

a container;

a first sensing element having a first end and a second end disposed in said container;

a first electrically conductive termination post extending between the inside and the outside of said container, the first electrically conductive termination post electrically interfacing with the second end of the first sensing element;

a second sensing element having a first end and a second end disposed in said container;

a second electrically conductive termination post extending between the inside and the outside of said container, the second electrically conductive termination post electrically interfacing with the second end of the second sensing element;

a thermocouple junction comprised of the first end of the first sensing element electrically connected to the first end of the second sensing element;

at least two heater elements each having a first end and a second end disposed within said container;

a third electrically conductive termination post extending between the inside and the outside of said container, the third electrically conductive termination post electrically interfacing with the first ends of the heater element; and a fourth electrically conductive termination post extending between the inside and the outside of said container, the fourth electrically conductive termination post electrically interfacing with the second ends of the heater element wherein said heater elements are disposed on either side of said thermocouple junction.

18. The claim according to claim 17, wherein said first and said second sensing elements are formed of dissimilar materials.

19. A thermocouple tilt sensing device comprising:

a container;

a first sensing element having a first end and a second end disposed in said container;

a first electrically conductive termination post extending between the inside and the outside of said container, the first electrically conductive termination post electrically interfacing with the second end of the first sensing element;

a second sensing element having a first end and a second end disposed in said container;

a second electrically conductive termination post extending between the inside and the outside of said container, the second electrically conductive termination post electrically interfacing with the second end of the second sensing element;

a thermocouple junction comprised of the first end of the first sensing element electrically connected to the first end of the second sensing element;

a heater element having a first end and a second end disposed within said container;

a third electrically conductive termination post extending between the inside and the outside of said container, the third electrically conductive termination post electrically interfacing with the first end of the heater element, said third electrically conductive termination post extending inside said container to a plane parallel to said thermocouple junction; and a fourth electrically conductive termination post extending between the inside and the outside of said container, the fourth electrically conductive termination post electrically interfacing with the second end of the heater element, said fourth electrically conductive termination post extending inside said container to a plane parallel to said thermocouple junction wherein said heater element is disposed on one side of said thermocouple junction.

20. The claim according to claim 19, wherein said first and said second sensing elements are formed of dissimilar materials.

21. The claim according to claim 19, wherein said container is substantially gas-tight.

22. The claim according to claim 19, wherein said container is sealed gas-tight.

* * * * *